United States Patent
Weng et al.

(10) Patent No.: US 7,602,156 B2
(45) Date of Patent: Oct. 13, 2009

(54) BOOST CONVERTER

(75) Inventors: Hsiang-Chung Weng, Taipei (TW);
Ching-Fu Cheng, Taipei (TW);
Hsiang-Jui Hung, Taipei (TW);
Sun-Chen Yang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 393 days.

(21) Appl. No.: 11/525,133

(22) Filed: Sep. 22, 2006

(65) Prior Publication Data
US 2007/0096700 A1    May 3, 2007

(30) Foreign Application Priority Data
Nov. 1, 2005    (TW) ............... 94138320 A (51) Int. Cl.
*G05F 1/46*    (2006.01)
(52) U.S. Cl. ...................... 323/222
(58) Field of Classification Search ............ 323/322, 323/272, 267, 266, 225; 363/71
See application file for complete search history.

(56) References Cited

U.S. PATENT DOCUMENTS

| | | | |
|---|---|---|---|
| 4,513,361 A | 4/1985 | Rensink | |
| 4,812,672 A | 3/1989 | Cowan et al. | |
| 5,057,986 A | 10/1991 | Henze et al. | |
| 5,428,524 A | 6/1995 | Massie | |
| 5,434,769 A | 7/1995 | Severinsky | |
| 5,495,164 A | 2/1996 | Heng | |
| 5,552,695 A | 9/1996 | Schwartz | |
| 5,656,869 A | 8/1997 | Gluskoter et al. | |
| 5,712,536 A | 1/1998 | Haas et al. | |
| 5,731,731 A | 3/1998 | Wilcox et al. | |
| 5,764,037 A * | 6/1998 | Jacobs et al. ......... | 323/222 |
| 5,847,548 A | 12/1998 | He et al. | |
| 5,914,588 A * | 6/1999 | Jiang ................ | 323/267 |

(Continued)

FOREIGN PATENT DOCUMENTS

TW     1223487     11/2004

(Continued)

OTHER PUBLICATIONS

Po-Wa Lee; Yim-shu Lee; David K. W. Cheng and Xiu-Cheng Liu Steady-State Analysis of an Interleaved Boost Converter with Coupled Inductors IEEE Transactions on Electronics, pp. 787 to 795. vol. 47, No. 4, Aug. 2000.*

*Primary Examiner*—Jeffrey L Sterrett
*Assistant Examiner*—Yemane Mehari
(74) *Attorney, Agent, or Firm*—Winston Hsu (57) ABSTRACT

A boost converter includes a first boost conversion unit and a second boost conversion unit. Coils of the first boost conversion unit and the second boost conversion unit are coupled with each other. Due to coupling of the coils, the second boost conversion unit releases energy while the first boost conversion unit stores energy in a period of time. Furthermore, due to coupling of the coils, the first boost conversion unit releases energy while the second boost conversion unit stores energy in another period of time. The two boost conversion units operate alternately, thereby adjusting switching loss and averaging output power of components. Furthermore, as switching frequency increases, the coil inductance, as well as the capacitance required in the two boost conversion units can be reduced correspondingly, thus substantially enhancing responses of the two boost conversion units as a whole.

18 Claims, 8 Drawing Sheets

U.S. PATENT DOCUMENTS

| | | | |
|---|---|---|---|
| 5,959,438 A * | 9/1999 | Jovanovic et al. | 323/222 |
| 6,084,790 A * | 7/2000 | Wong | 363/71 |
| 6,144,194 A | 11/2000 | Varga | |
| 6,169,675 B1 | 1/2001 | Shimamori et al. | |
| 6,243,277 B1 * | 6/2001 | Sun et al. | 363/65 |
| 6,252,383 B1 * | 6/2001 | Wittenbreder | 323/222 |
| 6,353,544 B1 | 3/2002 | Lau | |
| 6,370,044 B1 | 4/2002 | Zhang et al. | |
| 6,373,727 B1 | 4/2002 | Hedenskog et al. | |
| 6,377,477 B1 | 4/2002 | Xie et al. | |
| 6,400,583 B1 | 6/2002 | Lau | |
| 6,404,657 B1 | 6/2002 | Mangtani et al. | |
| 6,433,525 B2 | 8/2002 | Muratov et al. | |
| 6,490,179 B1 | 12/2002 | Boylan et al. | |
| 6,621,256 B2 | 9/2003 | Muratov et al. | |
| 6,670,794 B1 | 12/2003 | Wang et al. | |
| 6,731,524 B2 | 5/2004 | Elek et al. | |
| 6,771,521 B1 | 8/2004 | Xiong et al. | |
| 6,809,939 B1 | 10/2004 | Yang | |
| 6,813,166 B1 | 11/2004 | Chang et al. | |
| 6,822,427 B2 | 11/2004 | Wittenbreder | |
| 6,831,847 B2 | 12/2004 | Perry | |
| 6,850,401 B2 | 2/2005 | Inoue et al. | |
| 6,856,522 B1 | 2/2005 | Wittenbreder, Jr. | |
| 6,879,499 B2 | 4/2005 | Matsumoto | |
| 6,897,641 B1 | 5/2005 | Herbert | |
| 7,023,186 B2 * | 4/2006 | Yan | 323/225 |
| 7,116,087 B2 * | 10/2006 | Zhang et al. | 323/272 |
| 7,161,331 B2 * | 1/2007 | Wai et al. | 323/222 |
| 7,208,922 B2 * | 4/2007 | Kalfhaus | 323/222 |
| 7,218,081 B2 * | 5/2007 | Jang et al. | 323/266 |
| 7,230,405 B2 * | 6/2007 | Jang et al. | 323/222 |
| 7,339,345 B2 * | 3/2008 | Degner et al. | 318/800 |
| 2006/0087295 A1 * | 4/2006 | Jang et al. | 323/222 |
| 2006/0226816 A1 * | 10/2006 | Wai et al. | 323/222 |

FOREIGN PATENT DOCUMENTS

| | | |
|---|---|---|
| TW | 200503375 | 1/2005 |
| TW | M275625 | 9/2005 |

\* cited by examiner

BOOST CONVERTER

BACKGROUND OF THE INVENTION

1. Field of the Invention

The invention generally relates to a boost converter, and more particularly, to a boost converter utilizing coupled coils.

2. Description of the Prior Art

Figure 1:
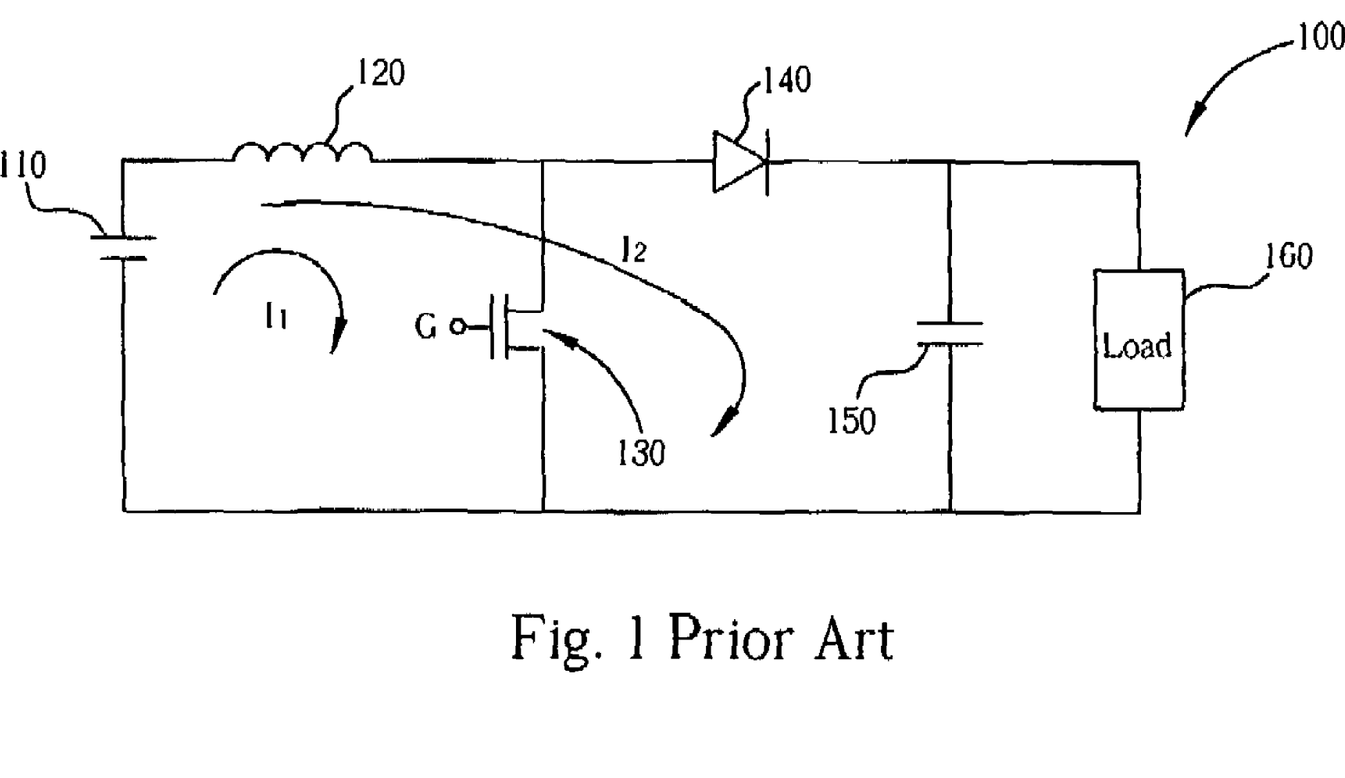
FIG. 1 is a circuit diagram of a conventional boost converter.

A boost converter is a periodically switching converter commonly used for boosting voltage and adjusting power factor in circuits. FIG. 1 is a circuit diagram of a conventional boost converter 100. The boost converter 100 includes a voltage source 110, an inductor 120, a power switch component 130, a diode 140, a capacitor 150, and a load 160. A gate terminal G of the power switch component 130 is controlled by a pulse width modulation (PWM) signal. Furthermore, a turn-on time for the power switch component 130 in a period is controlled by modulating a duty cycle of the PWM signal. When the power switch component 130 is turned on, the voltage source 110, the inductor 120, and the power switch component 130 form a closed loop, and thus current $I_1$ flowing through the closed loop drives the inductor 120 to store energy until the power switch component 130 is turned off. When the power switch component 130 is turned off, the inductor 120 is in an energy releasing state, and thus current $I_2$ from the inductor 120 flows to the load 160 through the diode 140. In other words, when the power switch component 130 is turned off, the inductor 120 continuously releases its stored energy. As the current $I_2$ charges the capacitor 150, the released energy is gradually stored in the capacitor 150 and the load 160, thus achieving the goal of voltage boost. As known to those skilled in the art, the relationship between an input voltage Vi and an average value of an output voltage Vo is as follows:

$$Vo/Vin = 1/(1-D) \qquad \text{equation (1)}.$$

Figure 2:
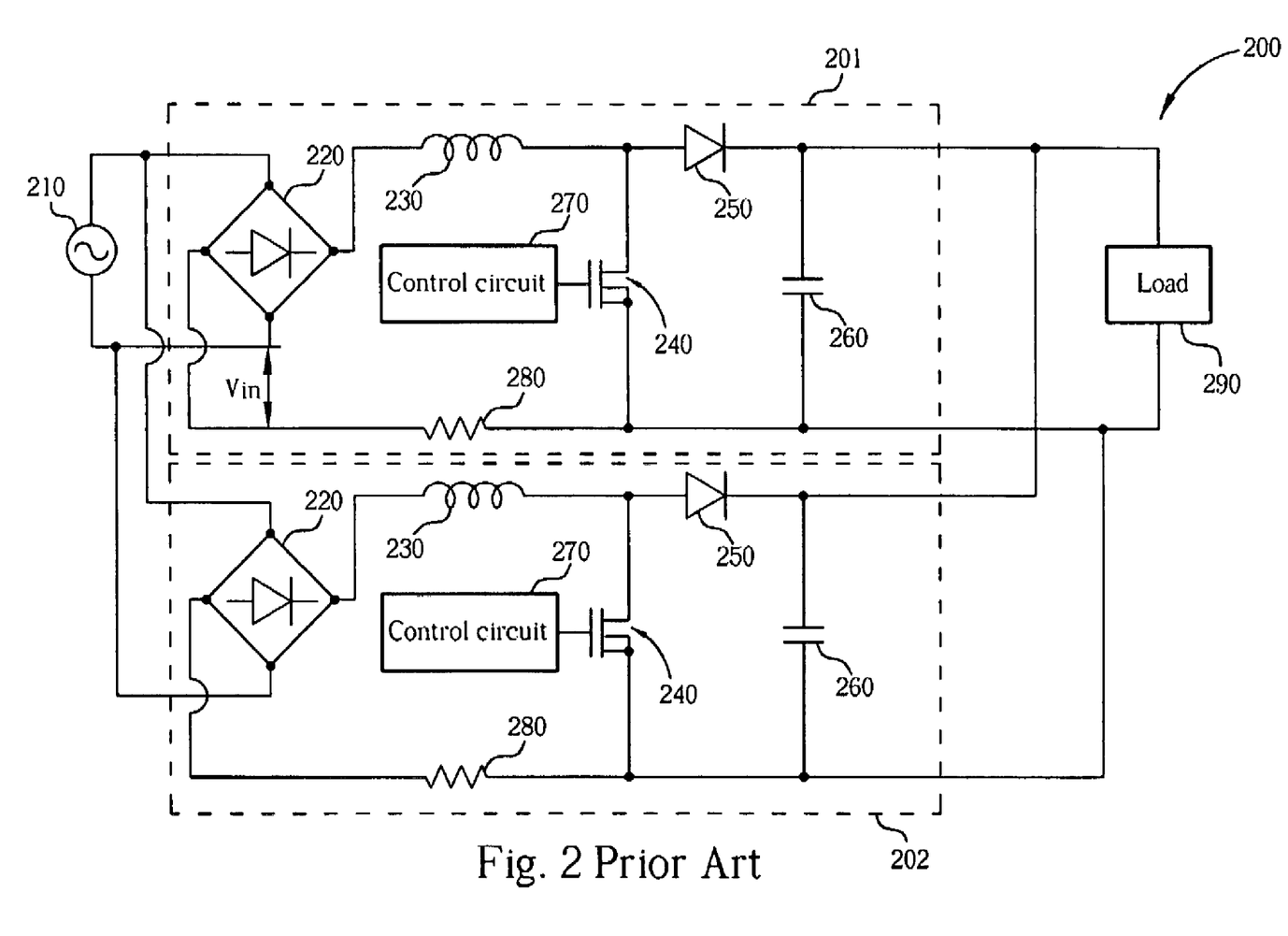
FIG. 2 is a circuit diagram of two conventional boost conversion units connected in a parallel style.

Due to excessive current and switching loss, the power switch component 130 suffers from a great deal of dissipated heat, thus degrading effectiveness and bringing the extra burden of needing to incorporate a heat dissipation mechanism. As a result, a relatively expensive power switch component capable of sustaining high stress and having low switching loss is needed herein. However, if power loss from the power switch component 130 can be distributed, the heat dissipation mechanism can be simplified or avoided, thus utilizing restricted space for circuits more efficiently. As shown in FIG. 2, another conventional boost converter 200 includes two boost conversion units 201 and 202. Currents from an alternating current (AC) voltage source 210 flow through the boost conversion units 201 and 202, and thus are rectified by rectifiers 220 respectively to form a direct current (DC) voltage. The remaining parts, including inductors 230, power switch components 240, diodes 250, capacitors 260, control circuits 270 for controlling an on/off status of the boost conversion units 201 and 202, and resistors 280, are identical to those in the boost converter 100 shown in FIG. 1. Outputs of the two boost conversion units 201 and 202 are both connected to two ends of a load 290, which means the boost conversion units 201 and 202 are connected in a parallel style. The boost conversion units 201 and 202 utilize a same control circuit as their control circuits 270 respectively. In other words, the power switch components 240 of the boost conversion units 201 and 202 are controlled by the same control signal. Therefore, the two power switch components 240 are both turned on or turned off simultaneously, and thus the two inductors 230 store or release energy simultaneously. Because of the parallel connection style, currents in the whole circuits are evenly distributed to the two boost conversion units 201 and 202, and thus heat dissipation is evenly distributed to the two power switch components 240 in FIG. 2, which differs from the situation in the boost converter 100 shown in FIG. 1.

SUMMARY OF THE INVENTION

One aim of the present invention is to provide a boost converter. According to an embodiment of the present invention, a boost converter is disclosed. The boost converter comprises a first boost conversion unit and a second boost conversion unit. The first boost conversion unit comprises: a first coil, having a first end coupled to a first voltage level; a first switch component, coupled between a second end of the first coil and a second voltage level, for selectively connecting the second end of the first coil to the second voltage level; a second switch component, wherein the first switch component and the second switch component are not turned on simultaneously; and a capacitor, having a first end coupled to the second switch component and a second end coupled to the second voltage level; wherein the second switch component is coupled between the second end of the first coil and the first end of the capacitor for selectively connecting the second end of the first coil to the first end of the capacitor. The second boost conversion unit comprises: a second coil, having a first end coupled to the first voltage level; a third switch component, coupled between a second end of the second coil and the second voltage level, for selectively connecting the second end of the second coil to the second voltage level; and a fourth switch component, coupled between the second end of the second coil and the first end of the capacitor, for selectively connecting the second end of the second coil to the first end of the capacitor; wherein the third switch component and the fourth switch component are not turned on simultaneously. The first coil and the second coil are coupled to each other. When the first switch component is turned on, the fourth switch component is turned on simultaneously, and when the third switch component is turned on, the second switch component is turned on simultaneously.

According to another embodiment of the present invention, a boost conversion method is disclosed. The boost conversion method comprises: storing energy into a first coil of a first boost conversion unit in a first time period, wherein a voltage of the first coil is coupled to a second coil of a second boost conversion unit, and a cross voltage across the second coil is further coupled to a capacitor; and stopping storing energy into the first coil of the first boost conversion unit in a second time period, wherein a cross voltage across the first coil is coupled to the capacitor, and the cross voltage across the second coil is prohibited from being coupled to the capacitor.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
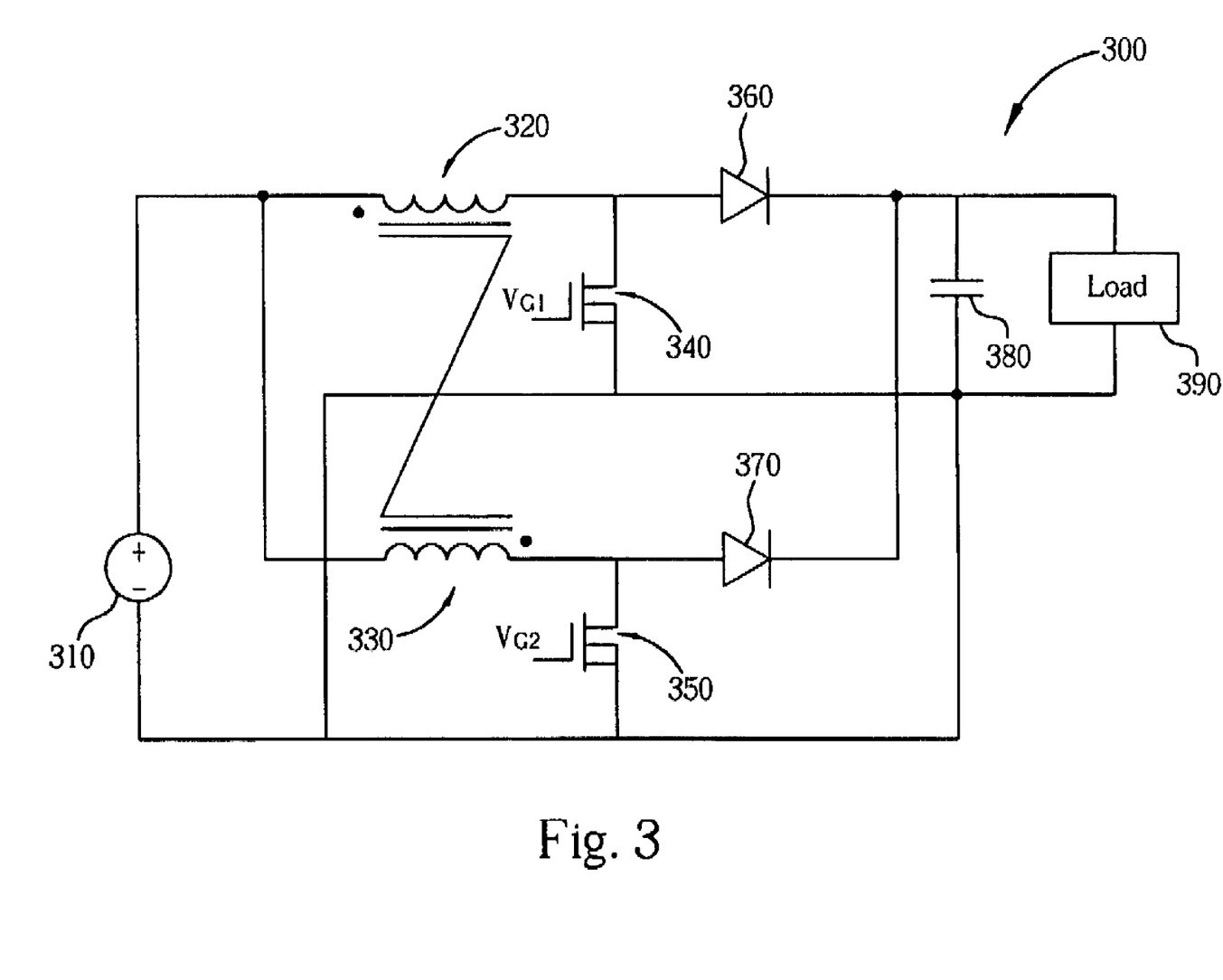
FIG. 3 is a circuit diagram of a boost converter of the present invention.

Please refer to FIG. 3. FIG. 3 is a circuit diagram of a boost converter 300 according to an embodiment of the present invention. In this embodiment, the boost converter 300 includes a voltage source 310, two conjugate coils 320 and 330, two power switch components 340 and 350, two switch components 360 and 370, and a filter 380. The voltage source 310 includes a first voltage level point and a second voltage level point, which can be a positive voltage output point and a negative voltage output point respectively in this embodiment. The negative voltage output point can also be regarded as a ground point. The two conjugate coils 320 and 330 are coils winding around the same core. Materials of the core can be air, or iron materials, where the iron materials can enhance mutual induction between the two conjugate coils 320 and 330. In this embodiment, the two conjugate coils 320 and 330 can be coils 320 and 330, for example. First coil ends of the coil 320 and the coil 330 are both connected to the first voltage level point of the voltage source 310, while second coil ends thereof are connected to the power switch component 340 and the power switch component 350 respectively. In this embodiment, the power switch component 340 or 350 can be, but is not limited to, an N-channel metal oxide semiconductor (NMOS) transistor, i.e. an N-channel metal oxide semiconductor field effect transistor (MOSFET), or a junction field effect transistor (JFET). The power switch component 340 or 350 can also be implemented using a P-channel MOS (PMOS) transistor, i.e. a P-channel MOSFET. In this embodiment, the power switch component 340 is an NMOS transistor, where a first end of the power switch component 340 is connected to the coil 320, and a second end is connected to the second voltage level point of the voltage source 310. Similarly, a first end of the power switch component 350 is connected to the coil 330, and a second end is connected to the second voltage level point of the voltage source 310. Moreover, gate terminals of the power switch component 340 and the power switch component 350 are respectively connected to first and second control signals $V_{G1}$ and $V_{G2}$. The first control signal $V_{G1}$ and second control signal $V_{G2}$ respectively control whether the power switch component 340 and the power switch component 350 are turned on or turned off. In this embodiment, the two switch components 360 and 370 are implemented by diodes 360 and 370. A first end of the diode 360 is connected to a second coil end of the coil 320. Similarly, a first end of the diode 370 is connected to a second coil end of the coil 330. Moreover, second ends of the diode 360 and the diode 370 are connected to each other. It should be noted that the switch components 360 and 370 are not limited to be implemented by the diodes 360 and 370. Therefore, other active switch components or passive switch components, for example, switch components formed by MOS transistors, can be utilized instead. In this embodiment, the filter 380 can be a capacitor 380, where a first end of the filter 380 is connected to the switch components 360 and 370, and a second end of the filter 380 is connected to the second voltage level point of the voltage source 310. In other embodiments, the filter 380 can also be a filter formed by a combination of inductor(s) and capacitor(s).

Please refer to FIG. 3 again. The boost converter 300 includes a DC voltage source 310, a first boost conversion unit, and a second boost conversion unit. The first boost conversion unit includes the coil 320, the power switch component 340, the diode 360, and the capacitor 380. The second boost conversion unit includes the coil 330, the power switch component 350, the diode 370, and the capacitor 380. Please note that the capacitor 380 is common to the first and the second boost conversion units. The coil 320 and the coil 330 are conjugate coils coupled to each other. With internal magnetizing inductance in a transformer, the coils 320 and 330 form inductive energy storing components, thus achieving the effects of mutual coupling and induction using a transformer architecture.

Figure 4:
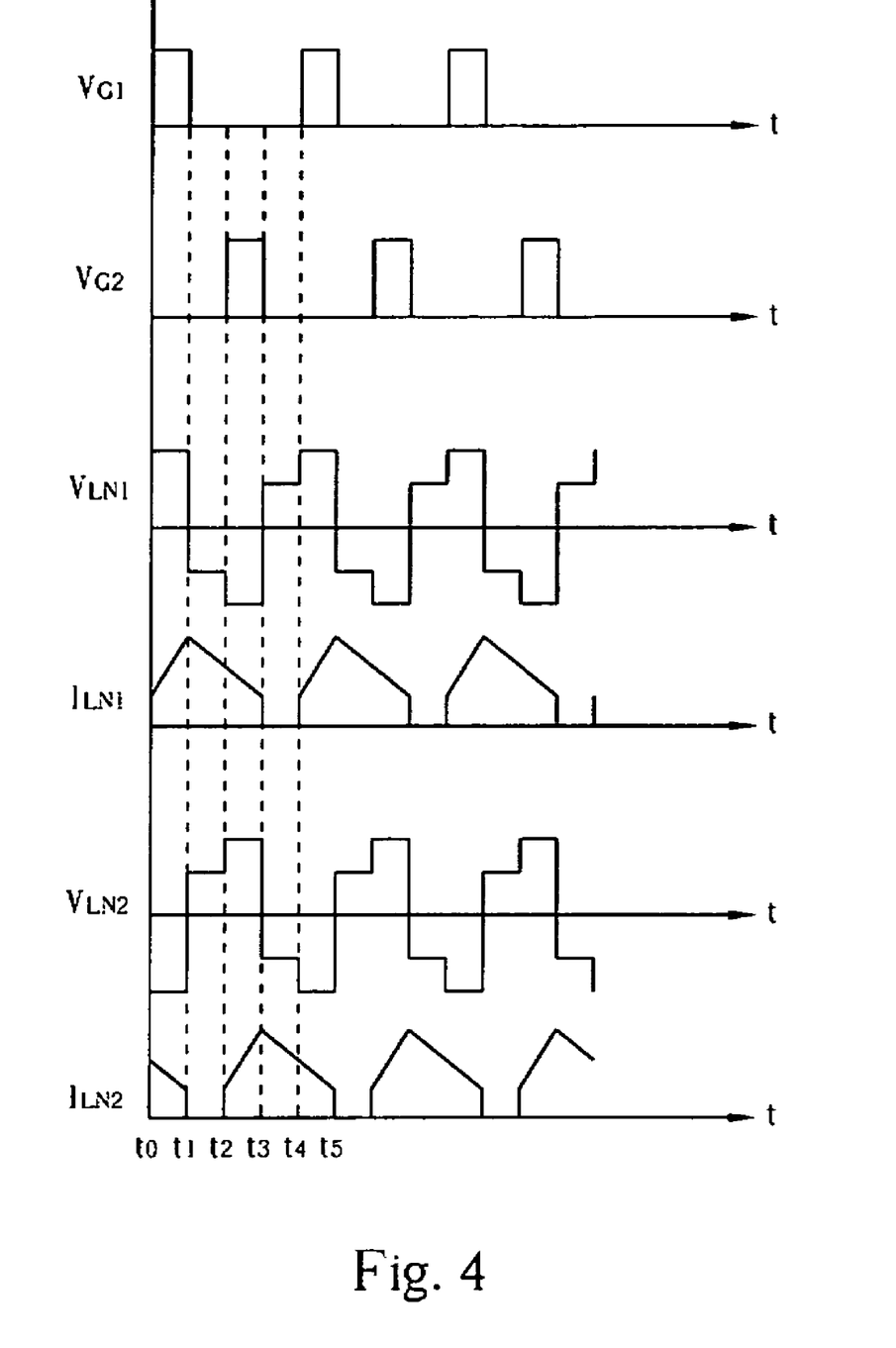
FIG. 4 is a timing diagram of the boost converter in FIG. 3.
Figure 5:
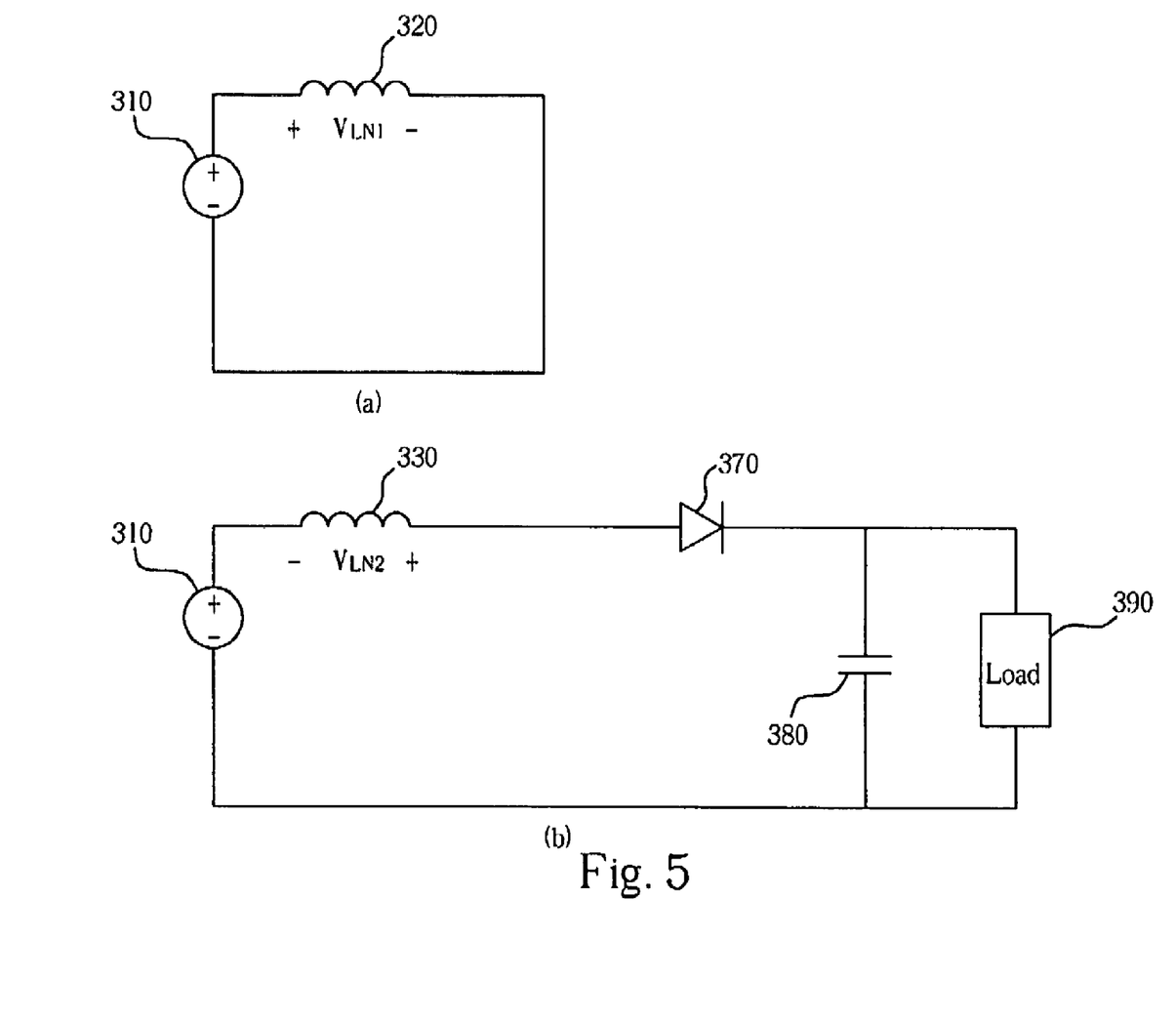
FIG. 5(a) is a circuit diagram of a first boost conversion unit in an energy storing state.
FIG. 5(b) is a circuit diagram of a second boost conversion unit in an energy releasing state.
Figure 6:
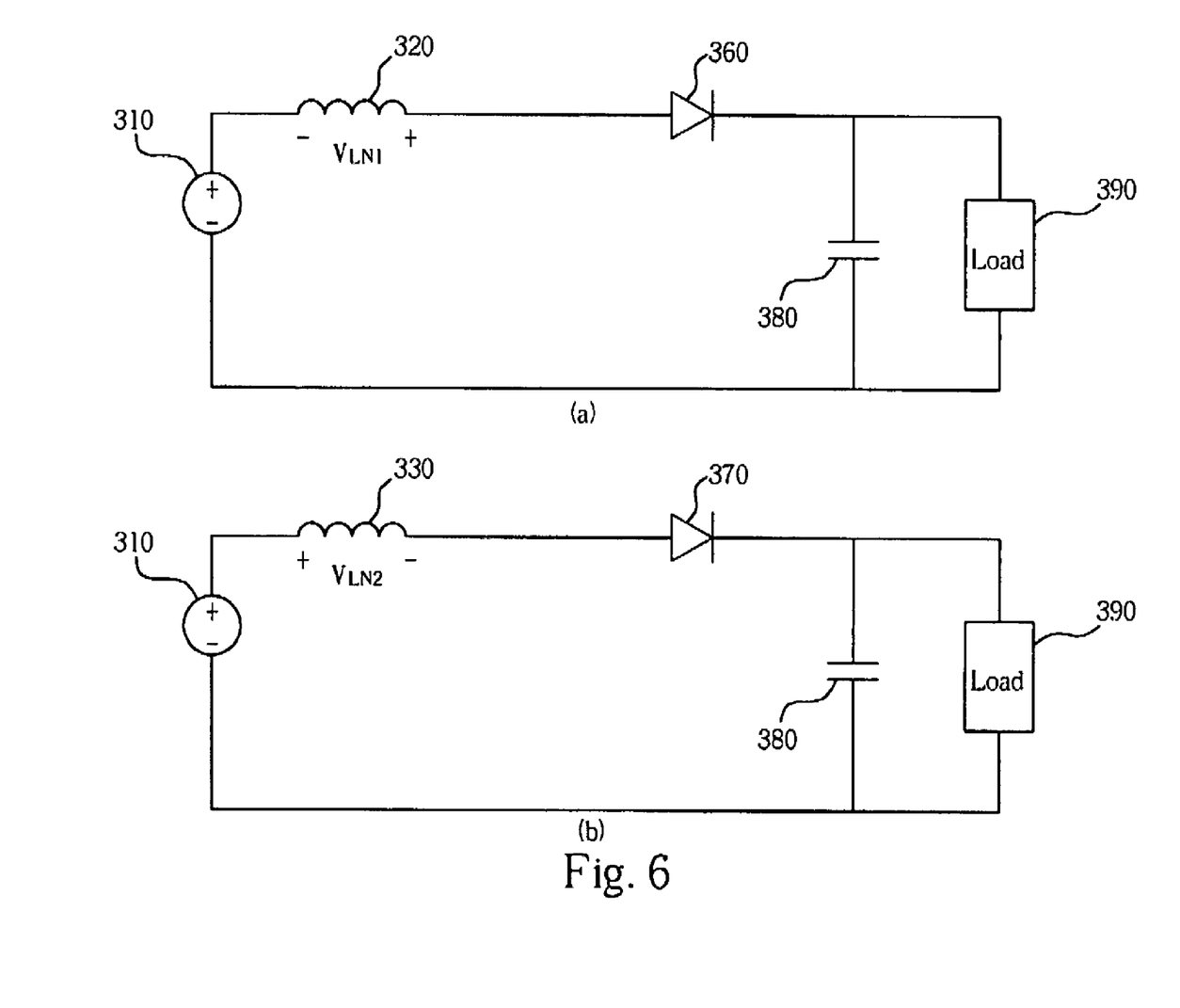
FIG. 6(a) is a circuit diagram of a first boost conversion unit in an energy releasing state.
FIG. 6(b) is a circuit diagram of a second boost conversion unit being turned off.

First, the first coil end of the coil 320, which is coupled to the DC voltage source 310, is defined as a positive end, and the second coil end of the coil 320, which is coupled to the power switch component 340, is defined as a negative end. It should be noted that the first coil end of the coil 320 and the second coil end of the coil 330 correspond to the same polarity, and the second coil end of the coil 320 and the first coil end of the coil 330 correspond to the same polarity. In other words, when current flows through the coil 320 in a direction from the DC voltage source 310 to the power switch component 340, a positive voltage is established at the first coil end of the coil 3201; otherwise, a negative voltage is established at the first coil end of the coil 320. $V_{G1}$ is the control signal of the power switch component 340, and $V_{G2}$ is the control signal of the power switch component 350. In this embodiment, it is feasible that the power switch components 340 and 350 are not turned on at the same time. Moreover, frequencies of the control signal $V_{G1}$ and the control signal $V_{G2}$ are adjustable, which means that the power switch components 340 and 350 are controlled in a frequency-variable style. It should be noted that the power switch components 340 and 350 can be, but are not limited to, NMOS transistors in this embodiment. However, the power switch components 340 and 350 can be implemented by JFETs or PMOS transistors in other embodiments of the present invention. Please refer to FIG. 4. FIG. 4 is a timing diagram corresponding to the embodiment shown in FIG. 3 where the power switch components 340 and 350 are implemented by NMOS transistors. Between time points $t_0$ and $t_1$, the power switch component 340 is turned on, the power switch component 350 is turned off, and the diode 360 is reversely biased. An equivalent circuit diagram of the first boost conversion unit is shown in FIG. 5(a). Meanwhile, a voltage $V_{LN1}$ across the two coil ends of the coil 320 is a positive voltage equal to a voltage provided by the DC voltage source 310, and a current $I_{LN1}$ flowing through the coil 320 increases linearly. At the same time, the coil 330 induces a voltage $V_{LN2}$ thereon by effects of coupling with the coil 320, thus forcing the diode 370 in the second boost conversion unit to be forwardly biased. An equivalent circuit diagram of the second boost conversion unit is shown in FIG. 5(b). Meanwhile, energy stored by the coil 330 is released to a load 390. Between time points $t_1$ and $t_2$, the power switch components 340 and 350 are both turned off, and the coil 320 in the first boost conversion unit starts releasing its stored energy, thus forcing the diode 360 to be forwardly biased, i.e. be turned on, and then transferring energy to the load 390 via the turned-on diode 360. Meanwhile, the voltage $V_{LN1}$ across the two coil ends of the coil 320 reverses its polarity from positive to negative, and the current $I_{LN1}$ decreases linearly. An equivalent circuit diagram of the first boost conversion unit is shown in FIG. 6(a). Moreover, the voltage $V_{LN2}$ on the coil 330 in the second boost conversion unit reverses its polarity from negative to positive by the effects of mutual inductive coupling. The diode 370 is thus reversely biased, so current flowing through the coil 330 drops to 0 in a very short period of time. An equivalent circuit diagram of the second boost conversion unit is shown in FIG. 6(b).

Figure 7:
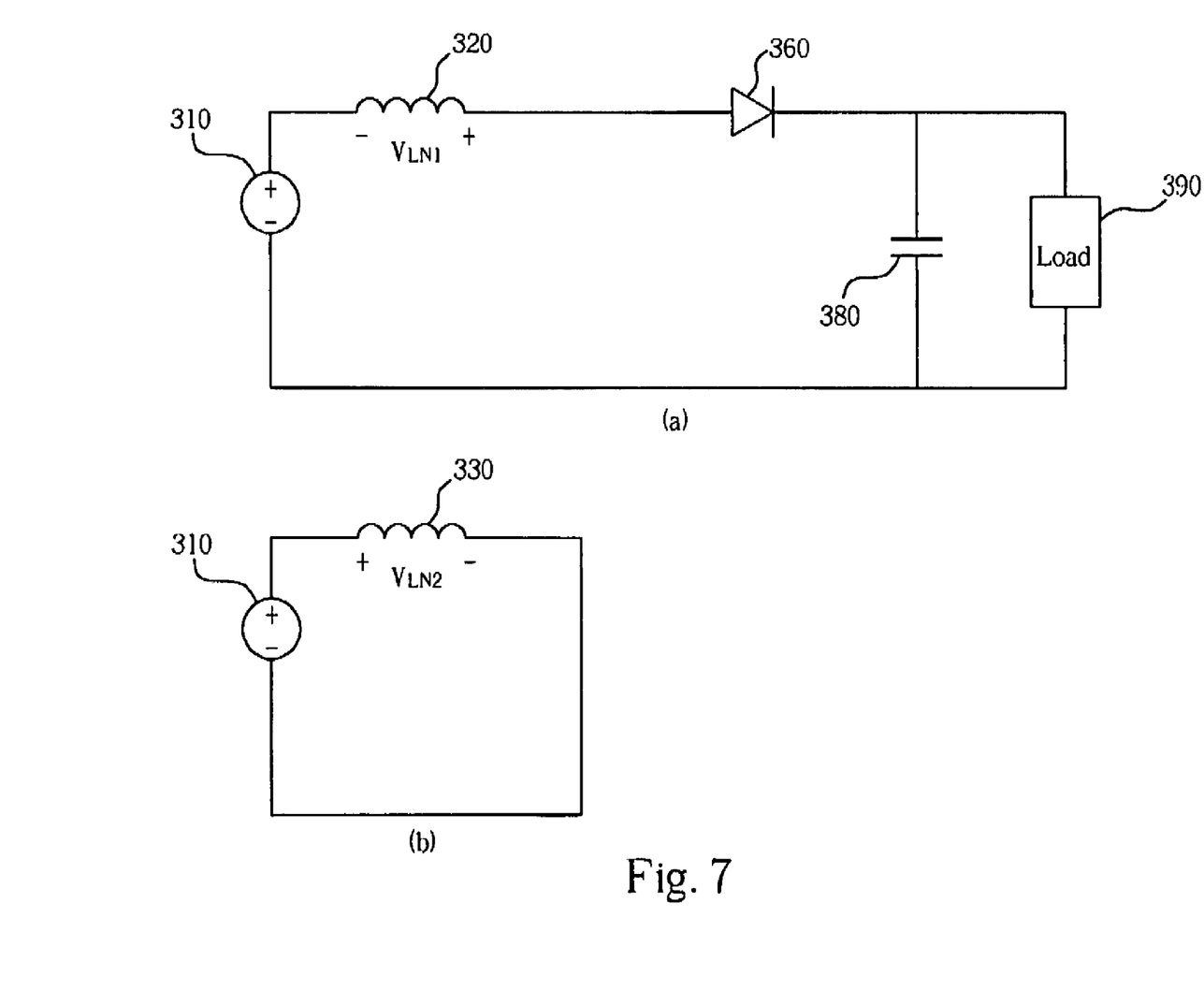
FIG. 7(a) is a circuit diagram of a first boost conversion unit in an energy releasing state.
FIG. 7(b) is a circuit diagram of a second boost conversion unit in an energy storing state.
Figure 8:
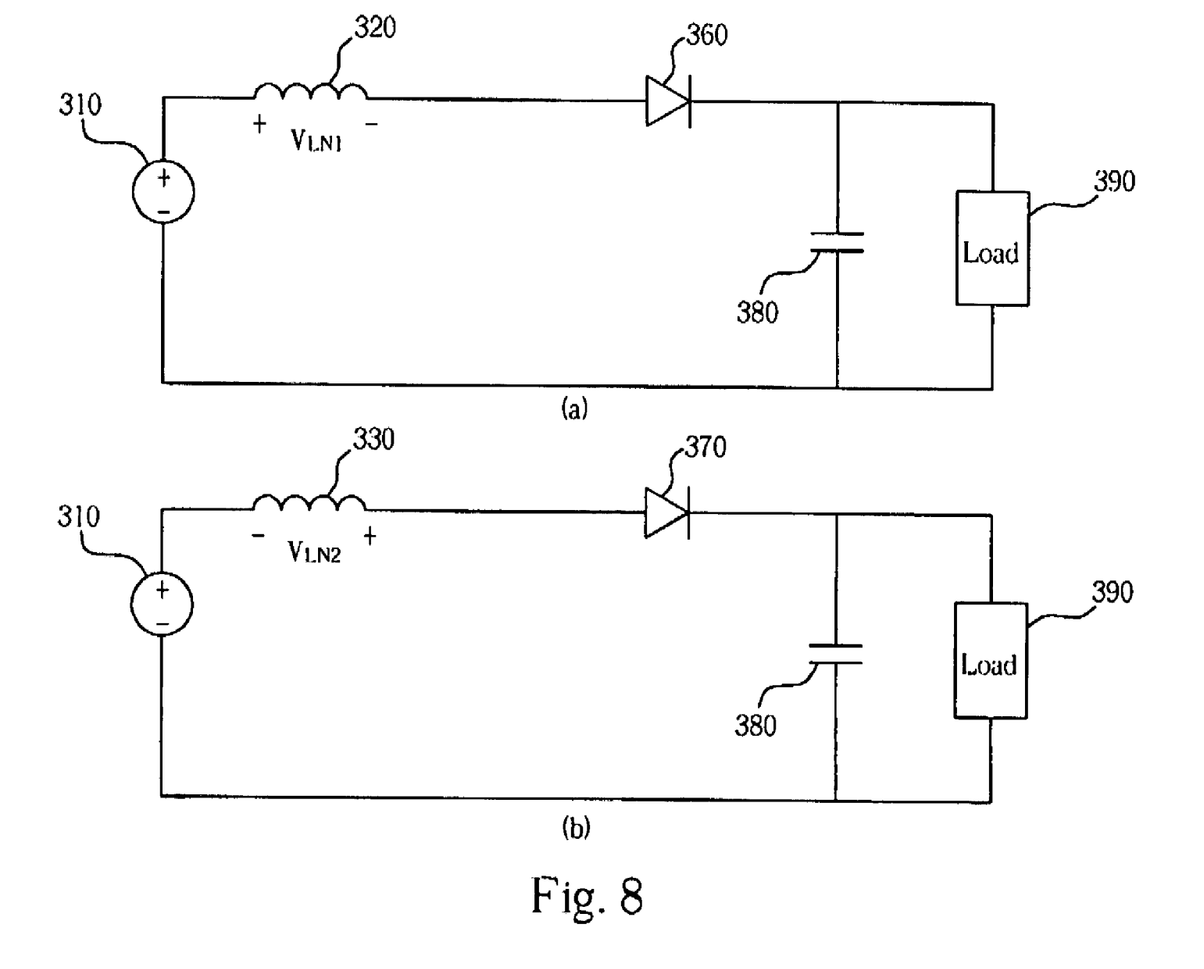
FIG. 8(a) is a circuit diagram of a first boost conversion unit being turned off.
FIG. 8(b) is a circuit diagram of a second boost conversion unit in an energy releasing state.

Between time points $t_2$ and $t_3$, the power switch component 350 is turned on, the power switch component 340 is turned off, and the diode 370 is reversely biased. An equivalent circuit diagram of the second boost conversion unit is shown in FIG. 7(b). Meanwhile, the coil 330 is in an energy storing state, the voltage $V_{LN2}$ across the two coil ends of the coil 330 is positive, and thus a current $I_{LN2}$ flowing through the coil 330 increases linearly. Moreover, the coil 320 induces a voltage $V_{LN1}$ thereon by the effects of coupling with the coil 330, thus forcing the diode 360 in the first boost conversion unit to be forwardly biased. An equivalent circuit diagram of the first boost conversion unit is shown in FIG. 7(a). Meanwhile, energy stored by the coil 320 is released to the load 390, and current flowing through the coil 320 decreases gradually. Afterwards, between time points $t_3$ and $t_4$, the power switch components 340 and 350 are both turned off, and the coil 330 in the second boost conversion unit starts releasing its stored energy, thus forcing the diode 370 to be forwardly biased, i.e. be turned on. As a result, the load 390 acquires energy released from the coil 330. Meanwhile, the voltage $V_{LN2}$ across the two coil ends of the coil 330 reverses its polarity from positive to negative, and the current $I_{LN2}$ decreases linearly. An equivalent circuit diagram of the second boost conversion unit is shown in FIG. 8(b). Moreover, the voltage $V_{LN1}$ on the coil 320 in the first boost conversion unit reverses its polarity from negative to positive by the effects of mutual inductive coupling. The diode 360 is thus reversely biased, so current flowing through the coil 320 drops to 0 in a very short period of time. An equivalent circuit diagram of the first boost conversion unit is shown in FIG. 8(a).

Afterwards, the first boost conversion unit and the second boost conversion unit operate repeatedly in the same process as mentioned above. Due to coupling of the coils 320 and 330, the second boost conversion unit releases energy while the first boost conversion unit stores energy in a period of time. Thus, the load 390 acquires energy in the same period of time. Then, when the first boost conversion unit completes storing energy and transits from an energy storing state to an energy releasing state, the load 390 acquires energy from the first boost conversion unit, and energy stored in the first boost conversion unit is gradually transferred to the load 390. Meanwhile, the second boost conversion unit is temporarily idle. Afterwards, in a similar way, the first boost conversion unit releases energy while the second boost conversion unit stores energy in another period of time due to coupling of the coils 320 and 330. Thus, the load 390 acquires energy in the same period of time. Then, when the second boost conversion unit completes storing energy and transits from an energy storing state to an energy releasing state, the load 390 acquires energy from the second boost conversion unit, and energy stored in the second boost conversion unit is gradually transferred to the load 390. Meanwhile, the first boost conversion unit is temporarily idle.

In conclusion, the present invention discloses that two boost conversion units are connected in a parallel style. Due to coupling of the coils, when one of the two boost conversion units stores energy, the other can still provide a load with energy. Moreover, the two boost conversion units are controlled by different control signals. Periods of the control signals are adjustable, and thus the two boost conversion units are controlled in a frequency-variable style. Therefore, a switching frequency of the two boost conversion units as a whole can be enhanced by connecting the two boost conversion units in a parallel style. If the two control signals, controlling the two boost conversion units, have frequencies of $f_1$ and $f_2$ respectively, the switching frequency as a whole can be enhanced to be $f_1+f_2$. Furthermore, the two boost conversion units operate alternately, thereby adjusting switching loss and averaging output power of components. As the switching frequency increases, the coil inductance, as well as the capacitance required in the two boost conversion units can be reduced correspondingly, thus substantially enhancing responses of the two boost conversion units as a whole. In addition to the above embodiments, the present invention can also utilize a multi-parallel style to connect more than two boost conversion units. In other words, an embodiment having three or more boost conversion units connected in a parallel style still falls in the scope of the present invention.

Although the present invention has been described with reference to preferred embodiments, those skilled in the art can easily ascertain its essential characteristics and, without departing from the spirit and scope thereof, can make numerous modifications, alterations, and equivalents of the invention to adapt it to various usages and conditions. Such modifications, alterations, and equivalents are intended to be encompassed in the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A boost converter, comprising:
   a first boost conversion unit, comprising:
   a first coil, having a first end coupled to a first voltage level;
   a first switch component, coupled between a second end of the first coil and a second voltage level, for selectively connecting the second end of the first coil to the second voltage level;
   a second switch component, wherein the first switch component and the second switch component are not turned on simultaneously; and
   a capacitor, having a first end coupled to the second switch component and a second end coupled to the second voltage level, wherein the second switch component is coupled between the second end of the first coil and the first end of the capacitor for selectively connecting the second end of the first coil to the first end of the capacitor; and
   a second boost conversion unit, comprising:
   a second coil, having a first end coupled to the first voltage level;
   a third switch component, coupled between a second end of the second coil and the second voltage level, for selectively connecting the second end of the second coil to the second voltage level; and
   a fourth switch component, coupled between the second end of the second coil and the first end of the capacitor, for selectively connecting the second end of the second coil to the first end of the capacitor, wherein the third switch component and the fourth switch component are not turned on simultaneously;

wherein the first coil and the second coil are coupled to each other, and when the first switch component is turned on, the fourth switch component is turned on simultaneously, and when the third switch component is turned on, the second switch component is turned on simultaneously.

2. The boost converter of claim 1, wherein the first switch component is a metal oxide semiconductor field effect transistor (MOSFET).

3. The boost converter of claim 1, wherein the third switch component is a MOSFET.

4. The boost converter of claim 1, wherein the second switch component is a diode.

5. The boost converter of claim 1, wherein the fourth switch component is a diode.

6. The boost converter of claim 1, wherein the first coil and the second coil are coils of a transformer.

7. The boost converter of claim 1, wherein an on/off status of the first switch component is determined by a first control signal, an on/off status of the third switch component is determined by a second control signal, and frequencies of the first control signal and the second control signal are adjustable.

8. A boost conversion method, comprising:

storing energy into a first coil of a first boost conversion unit in a first time period, wherein a voltage of the first coil is coupled to a second coil of a second boost conversion unit, wherein a first end of the first coil and a second end of the second coil correspond to a same polarity, and a second end of the first coil and a first end of the second coil correspond to a same polarity, and a cross voltage across the second coil is further coupled to a capacitor; and stopping storing energy into the first coil of the first boost conversion unit in a second time period, wherein a cross voltage across the first coil is coupled to the capacitor, and the cross voltage across the second coil is prohibited from being coupled to the capacitor.

9. The method of claim 8, further comprising:

storing energy into a second coil of the second boost conversion unit in a third time period, wherein a voltage of the second coil is coupled to the first coil of the first boost conversion unit, and the cross voltage across the first coil is further coupled to the capacitor; and stopping storing energy into the second coil of the second boost conversion unit in a fourth time period, wherein the cross voltage across the second coil is coupled to the capacitor, and the cross voltage across the first coil is prohibited from being coupled to the capacitor.

10. The method of claim 9, wherein the first time period allowing the first coil to store energy is controlled by a first control signal, the third time period allowing the second coil to store energy is controlled by a second control signal, and frequencies of the first control signal and the second control signal are adjustable.

11. The method of claim 8, wherein the first coil and the second coil are coils of a transformer.

12. A boost converter, comprising:

a voltage source, comprising a first voltage level point and a second voltage level point;

at least two conjugate coils, winding around a core, wherein a first coil of the at least two conjugate coils comprises a first coil end and a second coil end, a second coil of the at least two conjugate coils comprises a third coil end and a fourth coil end, the first coil end and the fourth coil end correspond to a same polarity, the second coil end and the third coil end correspond to a same polarity, and the first coil end and the third coil end are coupled to the first voltage level point;

a first power switch component, comprising a first end and a second end, wherein the first end is coupled with the second coil end, and the second end is coupled with the second voltage level point;

a first switch component, comprising a fourth end and a fifth end, wherein the fourth end is coupled with the second coil end;

a second power switch component, comprising a sixth end and a seventh end, wherein the sixth end is coupled with the fourth coil end, and the seventh end is coupled with the second voltage level point;

a second switch component, comprising a ninth end and a tenth end, wherein the ninth end is coupled with the fourth coil end, and the tenth end is coupled with the fifth end; and a filter, comprising a first filtering end and a second filtering end, wherein the first filtering end is coupled with the tenth end, and the second filtering end is coupled with the second voltage level point.

13. The boost converter of claim 12, wherein the core is an iron core.

14. The boost converter of claim 12, wherein the first power switch component is a MOSFET.

15. The boost converter of claim 12, wherein the first switch component is a diode.

16. The boost converter of claim 12, wherein the second power switch component is a MOSFET.

17. The boost converter of claim 12, wherein the second switch component is a diode.

18. The boost converter of claim 12, wherein the filter is a capacitor.

* * * * *

UNITED STATES PATENT AND TRADEMARK OFFICE
CERTIFICATE OF CORRECTION

PATENT NO. : 7,602,156 B2 Page 1 of 1
APPLICATION NO. : 11/525133
DATED : October 13, 2009
INVENTOR(S) : Weng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 414 days.

Signed and Sealed this

Fifth Day of October, 2010

David J. Kappos
*Director of the United States Patent and Trademark Office*